No Printed Specification Available
7279X
N. Rider.
Spindle.
Patented Nov. 3, 1832.
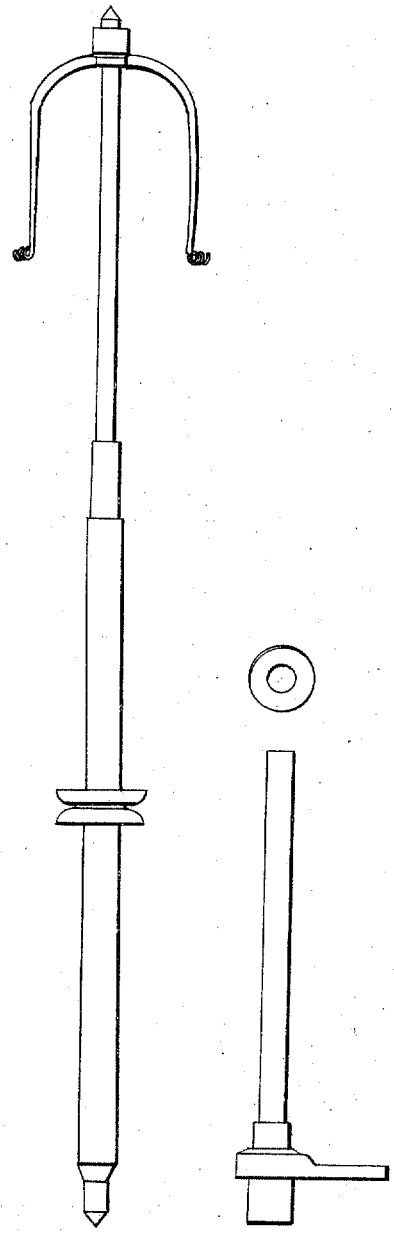
N. PETERS, PHOTO-LITHOGRAPHER, WASHINGTON, D. C.

7279X Nov 3 1832

Nathaniel Rider. Dudley. Mass.

Letters Patent

The Schedule referred to in these Letters Patent and making part
of the same containing a description in the words of the said Nathan
iel Rider himself of his improvement in the cotton spindle To all to whom these presents shall come. Be it known that
I Nathaniel Rider of Dudley in the County of Worcester and Common
wealth of Massachusetts have invented a new and useful improve
ment in the cotton spindle which is commonly called the live spindle
for spinning cotton yarn now in common use and that the following
is a full and exact description of the construction and operation
of the said improvement as invented or improved by me
The improvement consists of a polished cylindrical tube or hollow
spindle made of iron, steel or any other metallic substance either
by drilling out the same or by bending from sheets - said tube or hollow
spindle to be about six inches & five eighths of an inch in length and
at the bottom part thereof to be about half an inch in the outer or
external diameter and to continue the same diameter upward about
one inch & one fourth of an inch and the remaining part of said
tube upward to be about seven sixteenths of an inch in its exter
nal diameter. the internal or inner diameter of said tube is to
be about 5/16[th] of an inch at the top and 3/8[th] of an inch at the
bottom or the said tube or hollow spindle may be of any other di
ameter or dimensions to fit or apply it to the common spindle now
in use and the said tube so constructed is to form a close but yet
free collar at the top or neck so called of the common live spindle
and the bottom part of said tube or hollow spindle encloses the lower
or neck of said live spindle extending through the collar now
used on the live spindle but not so far as to rest or bear upon
the lower shoulder of the live spindle. the collar now in use on

[illegible]

130 7279x Nov. 3, 1832 closing and confining the said tube or hollow spindle so that that
said tube cannot turn within the same. This tube or hollow spin
dle ^thus^ placed on the common live spindle is intended to be stationary
and form a sheath over the common live and main spindle from
its lower shoulder next above the whirl in the common spindle
to the top shoulder where the flyer of said common spindle is
spindle is screwed on the bobbin or spool. which receives the yarn is
placed on & over the tube or hollow spindle in the same position or man
ner it is usually placed on the common live spindle to receive the yarn
rising and falling on said tube or hollow spindle as it does otherwise
wise would on the common live spindle without the tube and thus
by means of the spool or bobbin running on the tube instead of the
common live spindle a friction is created which gives it an easi
er & more steady draft and there is more certainty of its receiving
the yarn (especially upon an accelerated motion of the spindle) than
when placed directly upon the live spindle in the usual manner.
The washer instead of the one now in use on the common live spindle
under the spool or bobbin should be of small dimensions and so
small as to create the least possible friction & is to be made of sheet
iron or any other metallic substance.
What I claim as new and as my own invention or discovery in the
above described tube or hollow spindle & for which & the use of same
I ask an exclusive privilege is the particular form of the tube
made and constructed of the material above named the manner
of adjusting it to the common live spindle and the consequent
operation of the spool while in the act of filling, the metallic
washer as before described Exd. Witnesses Nathaniel Rider
WH. Geo N B [illegible]
John Jewitt (Patented 3 November 1832) ([illegible] month)